United States Patent
Li et al.

(10) Patent No.: US 11,184,850 B2
(45) Date of Patent: *Nov. 23, 2021

(54) BIDIRECTIONAL COMMUNICATION USING A WAKE-UP RADIO

(71) Applicant: Apple Inc., Cupertino, CA (US)

(72) Inventors: Guoqing Li, Cupertino, CA (US); Oren Shani, Saratoga, CA (US); Yong Liu, Campbell, CA (US)

(73) Assignee: Apple Inc., Cupertino, CA (US)

( * ) Notice: Subject to any disclaimer, the term of this patent is extended or adjusted under 35 U.S.C. 154(b) by 105 days.

This patent is subject to a terminal disclaimer.

(21) Appl. No.: 16/121,318

(22) Filed: Sep. 4, 2018

(65) Prior Publication Data

US 2019/0075520 A1    Mar. 7, 2019

Related U.S. Application Data

(60) Provisional application No. 62/554,439, filed on Sep. 5, 2017.

(51) Int. Cl.
*H04W 52/02* (2009.01)
*H04W 84/12* (2009.01)

(52) U.S. Cl.
CPC ..... *H04W 52/0225* (2013.01); *H04W 52/028* (2013.01); *H04W 52/0216* (2013.01); *H04W 52/0229* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 9,736,779 B2 | 8/2017 | Min | |
| 9,749,955 B2* | 8/2017 | Min | H04W 52/0229 |
| 2015/0334650 A1* | 11/2015 | Park | H04W 4/80 |
| | | | 370/311 |
| 2017/0332327 A1 | 11/2017 | Fang | |
| 2018/0077641 A1* | 3/2018 | Yang | H04L 69/22 |
| 2018/0103431 A1* | 4/2018 | Suh | H04W 52/0216 |

* cited by examiner

*Primary Examiner* — Peter Chen
*Assistant Examiner* — Jeff Banthrongsack
(74) *Attorney, Agent, or Firm* — Kowert, Hood, Munyon, Rankin & Goetzel, P.C.

(57) ABSTRACT

A recipient electronic device that provides an acknowledgment is described. This recipient electronic device may include a main radio and a wake-up radio (WUR) that at least selectively transitions the main radio from a lower-power mode to a higher-power mode in response to a wake-up frame. During operation, the WUR receives a wake-up frame associated with an electronic device, e.g., a second or a sending device. Then, the WUR provides, in response to the wake-up frame, the acknowledgement intended for the electronic device. The wake-up frame may specify that an acknowledgement from the recipient electronic device to the electronic device is expected. For example, the wake-up frame may specify that the acknowledgement is communicated by the recipient electronic device using the WUR in the recipient electronic device. Moreover, the WUR may provide the acknowledgment while the main radio is in the lower-power mode.

20 Claims, 9 Drawing Sheets

MAIN
RADIO
610          WAKE-UP
             FRAME
             612

WUR
628

MAIN
RADIO
618

WUR
710                    ACK
                       712

TIME

FIG. 7

BIDIRECTIONAL COMMUNICATION USING A WAKE-UP RADIO

CROSS-REFERENCE TO RELATED APPLICATION

This application claims the benefit of U.S. Provisional Application No. 62/554,439, entitled "Bidirectional Communication Using a Wake-Up Radio," by Guoqing Li, et al., filed Sep. 5, 2017, the contents of which are hereby incorporated by reference.

FIELD

The described embodiments relate, generally, to wireless communications among electronic devices, and techniques for bidirectional communication using a wake-up radio.

BACKGROUND

Many electronic devices communicate with each other using wireless local area networks (WLANs), such as those based on a communication protocol that is compatible with an IEEE 802.11 standard (which is sometimes referred to as 'Wi-Fi'). However, a radio in an electronic device that communicates using wireless communication in a WLAN may consume a significant amount of power.

In order to address this challenge, a new radio technology called Low Power Wake Up Radio is being considered (in the discussion that follows a LP-WUR or WUR is sometimes referred to as a 'wake-up radio'). The wake-up radio may be a companion to the main Wi-Fi radio in the electronic device. Notably, by using the wake-up radio, the electronic device may turn off its main radio and may wake up the main radio in response to the wake-up radio receiving a wake-up radio packet from an access point. For example, the access point may send the wake-up radio packet when there is a down-link packet for the electronic device.

However, waking up the main radio can increase the power consumption of the electronic device and/or increase the latency of the communication.

SUMMARY

A first group of embodiments relates to a recipient electronic device that provides an acknowledgment. This recipient electronic device may include a node that can be communicatively coupled to an antenna, and an interface circuit communicatively coupled to the node and that communicates with a second electronic device. The interface circuit includes a main radio and a wake-up radio (WUR) that at least selectively transitions the main radio from a lower-power mode to a higher-power mode in response to a wake-up frame. During operation, the WUR receives a wake-up frame associated with the second electronic device. Then, the WUR provides, in response to the wake-up frame, the acknowledgement intended for the second electronic device.

Note that the acknowledgement may include a preamble and a header. Alternatively, the acknowledgement may exclude a preamble and a header.

Moreover, the acknowledgement may be communicated using a same physical format as the wake-up frame. Alternatively, the acknowledgement may be communicated using a different physical format as the wake-up frame.

Furthermore, the wake-up frame may specify that an acknowledgement from the recipient electronic device to the second electronic device is expected. Additionally, the wake-up frame may specify how the acknowledgement is communicated by the recipient electronic device. For example, the wake-up frame may specify that the acknowledgement is communicated by the recipient electronic device using the WUR in the recipient electronic device.

In some embodiments, the wake-up frame specifies a time duration that includes a duration of the wake-up frame, a duration of an inter-frame space, and a duration of the acknowledgement.

Moreover, the acknowledgement may include a payload field with data.

Furthermore, the wake-up frame may be compatible with an IEEE 802.11 communication protocol.

Additionally, the WUR may provide the acknowledgment while the main radio is in the lower-power mode.

Other embodiments provide an interface circuit in the recipient electronic device.

Other embodiments provide a computer-readable storage medium for use with the interface circuit or processing circuitry in the recipient electronic device. When program instructions stored in the computer-readable storage medium are executed by the interface circuit or the processing circuitry, the program instructions may cause the recipient electronic device to perform at least some of the aforementioned operations of the recipient electronic device.

Other embodiments provide a method for providing an acknowledgment. The method includes at least some of the aforementioned operations performed by the interface circuit or the processing circuitry in the recipient electronic device.

A second group of embodiments relates to a second electronic device that receives an acknowledgment. This second electronic device may include a node that can be communicatively coupled to an antenna, and an interface circuit communicatively coupled to the node and that communicates with a recipient electronic device. During operation, the interface circuit provides a wake-up frame intended for the recipient electronic device. Then, the interface circuit receives the acknowledgement associated with a WUR in the recipient electronic device.

Note that the second electronic device may include an access point.

Other embodiments provide an interface circuit in the second electronic device.

Other embodiments provide a computer-readable storage medium for use with the interface circuit or processing circuitry in the second electronic device. When program instructions stored in the computer-readable storage medium are executed by the interface circuit or the processing circuitry, the program instructions may cause the second electronic device to perform at least some of the aforementioned operations of the second electronic device.

Other embodiments provide a method for receiving an acknowledgment. The method includes at least some of the aforementioned operations performed by the interface circuit or the processing circuitry in the electronic device.

This Summary is provided for purposes of illustrating some exemplary embodiments, so as to provide a basic understanding of some aspects of the subject matter described herein. Accordingly, it will be appreciated that the above-described features are only examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The included drawings are for illustrative purposes and serve only to provide examples of possible structures and arrangements for the disclosed systems and techniques for intelligently and efficiently managing communication between multiple associated user devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

FIGS. 6-8 are drawings illustrating examples of communication between electronic devices, such as the electronic devices of FIG. 1.

Note that like reference numerals refer to corresponding parts throughout the drawings. Moreover, multiple instances of the same part are designated by a common prefix separated from an instance number by a dash.

DETAILED DESCRIPTION

Figure 1:
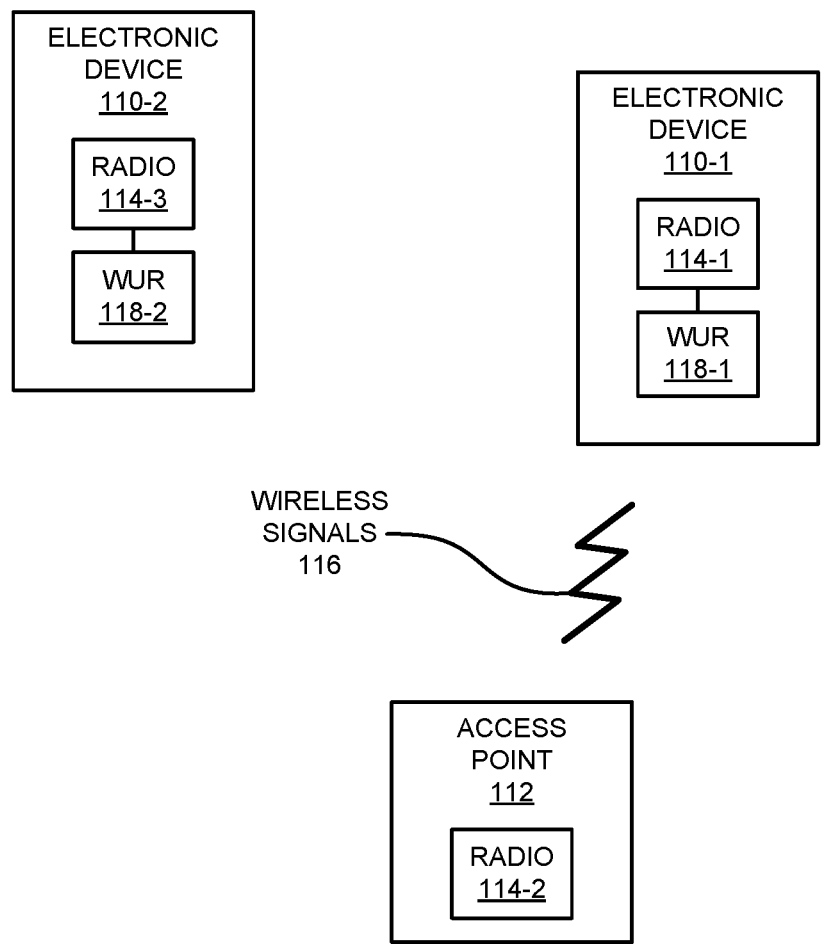
FIG. 1 is a block diagram illustrating an example of electronic devices communicating wirelessly.

A recipient electronic device that provides an acknowledgment is described. This recipient electronic device may include a main radio and a WUR that at least selectively transitions the main radio from a lower-power mode to a higher-power mode in response to a wake-up frame. During operation, the WUR receives a wake-up frame associated with an electronic device. Then, the WUR provides, in response to the wake-up frame, the acknowledgement intended for the electronic device. The wake-up frame may specify that an acknowledgement from the recipient electronic device to the electronic device is expected. For example, the wake-up frame may specify that the acknowledgement is communicated by the recipient electronic device using the WUR in the recipient electronic device. Moreover, the WUR may provide the acknowledgment while the main radio is in the lower-power mode.

By providing the acknowledgment using the WUR, these communication techniques may facilitate improved communication performance between the electronic device and the recipient electronic device. For example, the communication techniques may reduce the power consumption of the recipient electronic device by reducing the number of times the main radio is transitioned to the higher-power mode. Moreover, the communication techniques may reduce the latency (and, more generally, may improve communication performance) during communication between the electronic device and the recipient electronic device. Consequently, the communication techniques may improve the user experience when using the electronic device or the recipient electronic device, and therefore may increase customer satisfaction and retention.

Note that the communication techniques may be used during wireless communication between electronic devices in accordance with a communication protocol, such as a communication protocol that is compatible with an IEEE 802.11 standard (which is sometimes referred to as Wi-Fi). In some embodiments, the communication techniques are used with IEEE 802.11BA and/or IEEE 802.11ax, which are used as illustrative examples in the discussion that follows. However, this communication techniques may also be used with a wide variety of other communication protocols, and in electronic devices (such as portable electronic devices or mobile devices) that can incorporate multiple different radio access technologies (RATs) to provide connections through different wireless networks that offer different services and/or capabilities.

An electronic device can include hardware and software to support a wireless personal area network (WPAN) according to a WPAN communication protocol, such as those standardized by the Bluetooth Special Interest Group (in Kirkland, Wash.) and/or those developed by Apple (in Cupertino, Calif.) that are referred to as an Apple Wireless Direct Link (AWDL). Moreover, the electronic device can communicate via: a wireless wide area network (WWAN), a wireless metro area network (WMAN), a WLAN, near-field communication (NFC), a cellular-telephone or data network (such as using a third generation (3G) communication protocol, a fourth generation (4G) communication protocol, e.g., Long Term Evolution or LTE, LTE Advanced (LTE-A), a fifth generation (5G) communication protocol, or other present or future developed advanced cellular communication protocol) and/or another communication protocol. In some embodiments, the communication protocol includes a peer-to-peer communication technique.

The electronic device, in some embodiments, can also operate as part of a wireless communication system, which can include a set of client devices, which can also be referred to as stations or client electronic devices, interconnected to an access point, e.g., as part of a WLAN, and/or to each other, e.g., as part of a WPAN and/or an 'ad hoc' wireless network, such as a Wi-Fi direct connection. In some embodiments, the client device can be any electronic device that is capable of communicating via a WLAN technology, e.g., in accordance with a WLAN communication protocol. Furthermore, in some embodiments, the WLAN technology can include a Wi-Fi (or more generically a WLAN) wireless communication subsystem or radio, and the Wi-Fi radio can implement an IEEE 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; IEEE 802.11ax, or other present or future developed IEEE 802.11 technologies.

In some embodiments, the electronic device can act as a communications hub that provides access to a WLAN and/or to a WWAN and, thus, to a wide variety of services that can be supported by various applications executing on the electronic device. Thus, the electronic device may include an 'access point' that communicates wirelessly with other electronic devices (such as using Wi-Fi), and that provides access to another network (such as the Internet) via IEEE 802.3 (which is sometimes referred to as 'Ethernet'). However, in other embodiments the electronic device may not be an access point. As an illustrative example, in the discussion that follows the electronic device is or includes an access point.

Additionally, it should be understood that the electronic devices described herein may be configured as multi-mode wireless communication devices that are also capable of communicating via different 3G and/or second generation (2G) RATs. In these scenarios, a multi-mode electronic device or UE can be configured to prefer attachment to LTE networks offering faster data rate throughput, as compared to other 3G legacy networks offering lower data rate throughputs. For example, in some implementations, a multi-mode electronic device is configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable.

In accordance with various embodiments described herein, the terms 'wireless communication device,' 'electronic device,' 'mobile device,' 'mobile station,' 'wireless station,' 'wireless access point,' 'station,' 'access point' and 'user equipment' (UE) may be used herein to describe one or more consumer electronic devices that may be capable of performing procedures associated with various embodiments of the disclosure.

FIG. 1 presents a block diagram illustrating an example of electronic devices communicating wirelessly. Notably, one or more electronic devices 110 (such as a smartphone, a laptop computer, a notebook computer, a tablet, or another such electronic device) and access point 112 may communicate wirelessly in a WLAN using an IEEE 802.11 communication protocol. Thus, electronic devices 110 may be associated with access point 112. For example, electronic devices 110 and access point 112 may wirelessly communicate while: detecting one another by scanning wireless channels, transmitting and receiving beacons or beacon frames on wireless channels, establishing connections (for example, by transmitting connect requests), and/or transmitting and receiving packets or frames (which may include the request and/or additional information, such as data, as payloads). Note that access point 112 may provide access to a network, such as the Internet, via an Ethernet protocol, and may be a physical access point or a virtual or 'software' access point that is implemented on a computer or an electronic device. In the discussion that follows, electronic devices 110 are sometimes referred to as 'recipient electronic devices.'

As described further below with reference to FIG. 12, electronic devices 110 and access point 112 may include subsystems, such as a networking subsystem, a memory subsystem, and a processor subsystem. In addition, electronic devices 110 and access point 112 may include radios 114 in the networking subsystems. More generally, electronic devices 110 and access point 112 can include (or can be included within) any electronic devices with networking subsystems that enable electronic devices 110 and access point 112, respectively, to wirelessly communicate with another electronic device. This can include transmitting beacons on wireless channels to enable the electronic devices to make initial contact with or to detect each other, followed by exchanging subsequent data/management frames (such as connect requests) to establish a connection, configure security options (e.g., IPSec), transmit and receive packets or frames via the connection, etc.

As can be seen in FIG. 1, wireless signals 116 (represented by a jagged line) are communicated by radios 114-1 and 114-2 in electronic device 110-1 and access point 112, respectively. For example, as noted previously, electronic device 110-1 and access point 112 may exchange packets using a Wi-Fi communication protocol in a WLAN. As illustrated further below with reference to FIGS. 2-4, radio 114-1 may receive wireless signals 116 that are transmitted by radio 114-2. Alternatively, radio 114-1 may transmit wireless signals 116 that are received by radio 114-2. However, as described further below with reference to FIG. 5, radio 114-1 consumes additional power in a higher-power mode. If radio 114-1 remains in the higher-power mode even when it is not transmitting or receiving packets, the power consumption of electronic device 110-1 may be needlessly increased. Consequently, electronic devices 110 may include WURs 118 that listen for and/or receive wake-up frames (and/or other wake-up communications), e.g., from access point 112. When a particular electronic device (such as electronic device 110-1) receives a wake-up frame, WUR 118-1 may selectively wake-up radio 114-1, e.g., by providing a wake-up signal that selectively transitions radio 114-1 from a lower-power mode to the higher-power mode.

As discussed previously, transitioning radio 114-1 from the lower-power mode to the higher-power mode increases the power consumption of electronic device 110-1. In addition, this may increase the latency during communication between electronic device 110-1 and access point 112.

In order to address this challenge, WUR 118-1 may provide a response (such as an acknowledgment) to a wake-up frame. For example, as discussed further below with reference to FIGS. 2-4, WUR 118-1 may transmit an acknowledgment to access point 112 in response to receiving a wake-up frame. This acknowledgment may be transmitted while radio 114-1 remains in the lower-power mode. Thus, in some embodiments, WURs 118 may, at least selectively, transmit in addition to listening or receiving.

As described further below with reference to FIGS. 8-11, the acknowledgment may have a variety of formats. For example, the acknowledgement may include a preamble and a header. Alternatively, the acknowledgement may exclude a preamble and a header. Moreover, the acknowledgement may be communicated using a same physical format as the wake-up frame. Alternatively, the acknowledgement may be communicated using a different physical format as the wake-up frame. In some embodiments, the acknowledgement includes a payload field with data.

Furthermore, the wake-up frame may specify that an acknowledgement from electronic device 110-1 to access point 112 is expected. Additionally, the wake-up frame may specify how the acknowledgement is communicated by electronic device 110-1. For example, the wake-up frame may specify that the acknowledgement is communicated by electronic device 110-1 using WUR 118-1 in electronic device 110-1. In some embodiments, the wake-up frame specifies a time duration that includes a duration of the wake-up frame, a duration of an inter-frame space, and a duration of the acknowledgement.

In these ways, the communication techniques may allow electronic devices 110 and access point 112 to communicate efficiently (such as with low latency) using WURs 118, while significantly reducing the power consumption associated with radios 114 and WURs 118 in electronic devices 110. These capabilities may improve the user experience when using electronic devices 110.

Note that access point 112 and at least some of electronic devices 110 may be compatible with an IEEE 802.11 standard that includes trigger-based channel access (such as IEEE 802.11ax). However, access point 112 and at least this subset of electronic devices 110 may also communicate with one or more legacy electronic devices that are not compatible with the IEEE 802.11 standard (i.e., that do not use multi-user trigger-based channel access). In some embodiments, at least a subset of electronic devices 110 use multi-user transmission (such as orthogonal frequency division multiple access or OFDMA). For example, radio 114-2 may provide a trigger frame for the subset of recipient electronic devices. This trigger frame may be provided after a time delay (such as a time delay between, e.g., 10 and 300 ms), so that radio 114-1 has sufficient time to transition to the higher-power mode. Moreover, after WUR 118-1 receives a wake-up frame, WUR 118-1 or radio 114-1 (if radio 114-1 transitions to the higher-power mode) may provide a group acknowledgment to radio 114-2. For example, WUR 118-1 or radio 114-1 may provide the acknowledgment during an assigned time slot and/or in an assigned channel in the group acknowledgment. However, in some embodiments the one or more of electronic devices 110 may individually provide acknowledgments to radio 114-2. Thus, after WUR 118-1 receives the wake-up frame, WUR 118-1 or radio 114-1 (and, more generally, the WURs 118 or radios 114 in the one or more electronic devices 110) may provide an acknowledgment to radio 114-2.

In the described embodiments, processing a packet or frame in one of electronic devices 110 and access point 112 includes: receiving wireless signals 116 encoding a packet or a frame; decoding/extracting the packet or frame from received wireless signals 116 to acquire the packet or frame; and processing the packet or frame to determine information contained in the packet or frame (such as data in the payload).

In general, the communication via the WLAN in the communication techniques may be characterized by a variety of communication-performance metrics. For example, the communication-performance metric may include any/all of: an RSSI, a data rate, a data rate for successful communication (which is sometimes referred to as a 'throughput'), a latency, an error rate (such as a retry or resend rate), a mean-square error of equalized signals relative to an equalization target, inter-symbol interference, multipath interference, a signal-to-noise ratio (SNR), a width of an eye pattern, a ratio of a number of bytes successfully communicated during a time interval (such as a time interval between, e.g., 1 and 10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization').

Although we describe the network environment shown in FIG. 1 as an example, in alternative embodiments, different numbers and/or types of electronic devices may be present. For example, some embodiments may include more or fewer electronic devices. As another example, in other embodiments, different electronic devices can be transmitting and/or receiving packets or frames.

Figure 2:
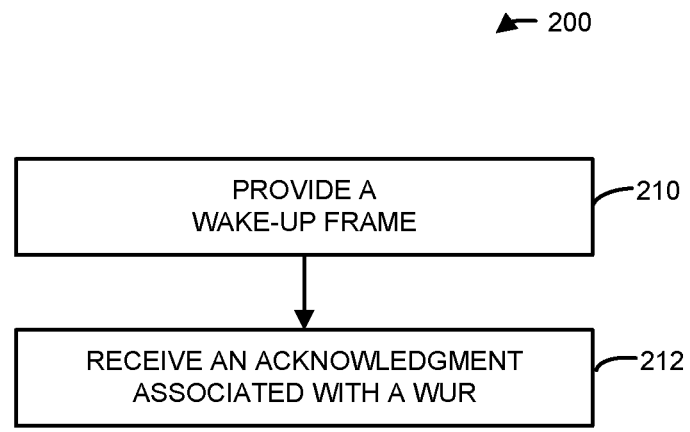
FIG. 2 is a flow diagram illustrating an example method for receiving an acknowledgment using one of the electronic devices in FIG. 1.

FIG. 2 presents a flow diagram illustrating an example method 200 for receiving an acknowledgment. This method may be performed by an electronic device, such as an interface circuit in access point 112 in FIG. 1. During operation, the interface circuit may provide a wake-up frame (operation 210) intended for the recipient electronic device. Then, the interface circuit may receive the acknowledgement associated with a WUR (operation 212) in the recipient electronic device.

Note that the acknowledgement may include a preamble and a header. Alternatively, the acknowledgement may exclude a preamble and a header.

Moreover, the acknowledgement may be communicated using a same physical format as the wake-up frame. Alternatively, the acknowledgement may be communicated using a different physical format as the wake-up frame. In some embodiments, the acknowledgement includes a payload field with data.

Furthermore, the wake-up frame may specify that an acknowledgement from the recipient electronic device to the electronic device is expected. Additionally, the wake-up frame may specify how the acknowledgement is communicated by the recipient electronic device. For example, the wake-up frame may specify that the acknowledgement is communicated by the recipient electronic device using the WUR in the recipient electronic device.

In some embodiments, the wake-up frame specifies a time duration that includes a duration of the wake-up frame, a duration of an inter-frame space, and a duration of the acknowledgement.

Moreover, the wake-up frame may be compatible with an IEEE 802.11 communication protocol.

Note that the electronic device may include an access point.

Figure 3:
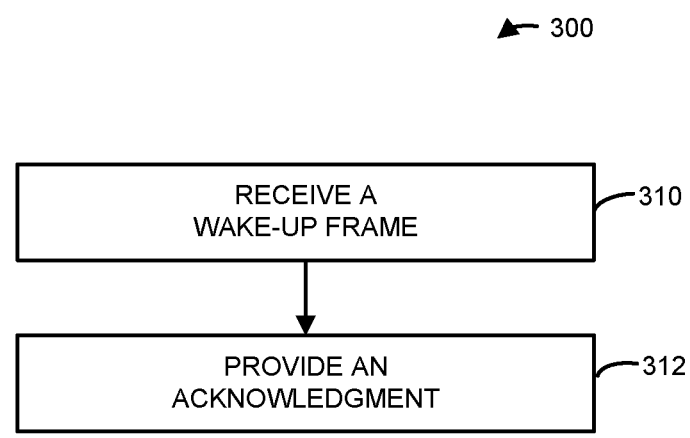
FIG. 3 is a flow diagram illustrating an example method for providing an acknowledgment using one of the electronic devices in FIG. 1.

FIG. 3 presents a flow diagram illustrating an example method 300 for providing an acknowledgment. This method may be performed by a recipient electronic device, such as an interface circuit in electronic device 110-1 in FIG. 1. This interface circuit may include a WUR and a main radio. During operation, the WUR may receive a wake-up frame (operation 310) associated with the electronic device. Then, the WUR may provide, in response to the wake-up frame, the acknowledgement (operation 312) intended for the electronic device.

Note that the WUR may provide the acknowledgment while the main radio is in the lower-power mode.

In some embodiments of methods 200 (FIG. 2) and/or 300, there may be additional or fewer operations. Further, one or more different operations may be included. Moreover, the order of the operations may be changed, and/or two or more operations may be combined into a single operation or performed at least partially in parallel.

In some embodiments, at least some of the operations in methods 200 (FIG. 2) and/or 300 are performed by an interface circuit in the electronic device. For example, at least some of the operations may be performed by firmware executed by an interface circuit, such as firmware associated with a MAC layer, as well as one or more circuits in a physical layer in the interface circuit.

Figure 4:
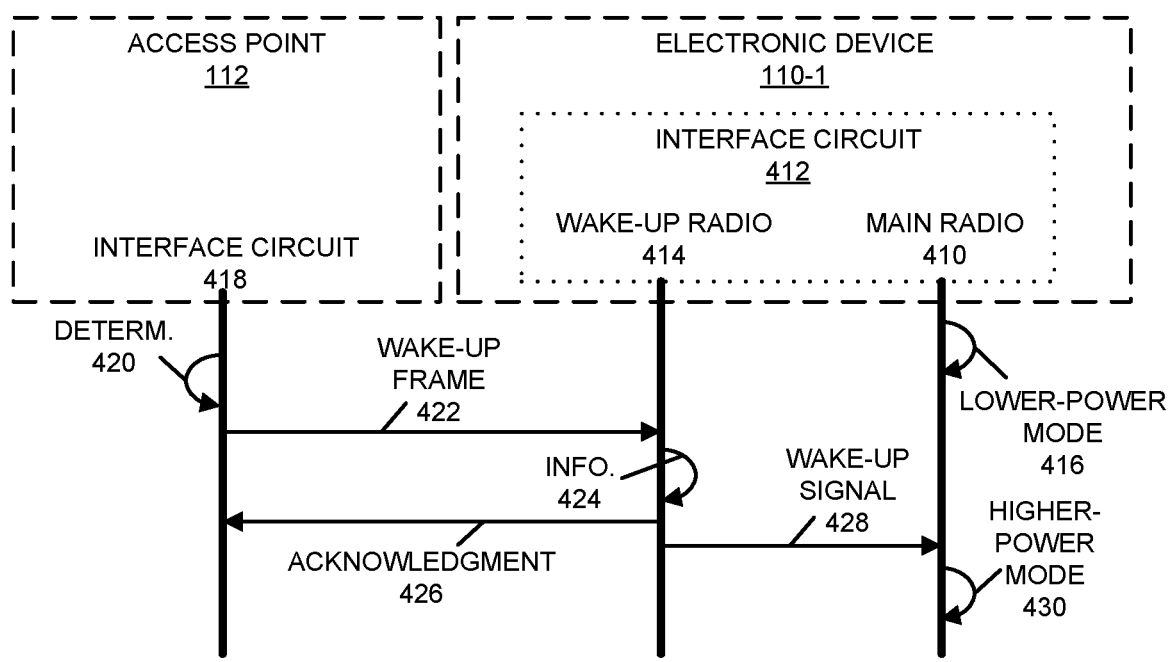
FIG. 4 is a flow diagram illustrating an example of communication between electronic devices, such as the electronic devices of FIG. 1.

The communication techniques are further illustrated in FIG. 4, which presents a flow diagram illustrating an example of communication between electronic device 110-1 and access point 112. After associating with access point 112, main radio 410 in interface circuit 412 in electronic device 110-1 may transition to a lower-power mode 416.

Next, interface circuit 418 may determine 420 to provide wake-up frame 422 for a WUR 414 (such as WUR 118-1) in interface circuit 412. For example, interface circuit 418 may determine 420 to provide wake-up frame 422 when there is downlink traffic (such as data associated with a service) for electronic device 110-1.

After receiving wake-up frame 422, WUR 414 may extract and analyze information 424. Then, WUR 414 may provide an acknowledgment 426 to access point 112.

Moreover, WUR 414 may selectively perform a remedial action. For example, WUR 414 may provide, to main radio

410, a wake-up signal 428 that transitions main radio 410 from lower-power mode 416 to a higher-power mode 430 based at least in part on information 424.

While communication between the components in FIG. 4 is illustrated with unilateral or bilateral communication (e.g., lines having a single arrow or dual arrows), in general a given communication operation may be unilateral or bilateral.

In some embodiments of the WUR technology, the communication techniques are used to communicate acknowledgments and/or other information using a WUR. If a recipient electronic device transitions a main radio from a lower-power mode to a higher-power mode in response to receiving a wake-up frame from an access point, the latency and/or the power consumption of the recipient electronic device may be increased.

In order to address this challenge, a WUR in a recipient electronic device may be communicate an acknowledgment and/or other information (such as data in a payload in the acknowledgment) in response to a wake-up frame. The acknowledgment may be provide by the WUR while the main radio remains in the lower-power mode or while the main radio is transitioning to the higher-power mode (and, thus, is still unavailable).

Figure 5:
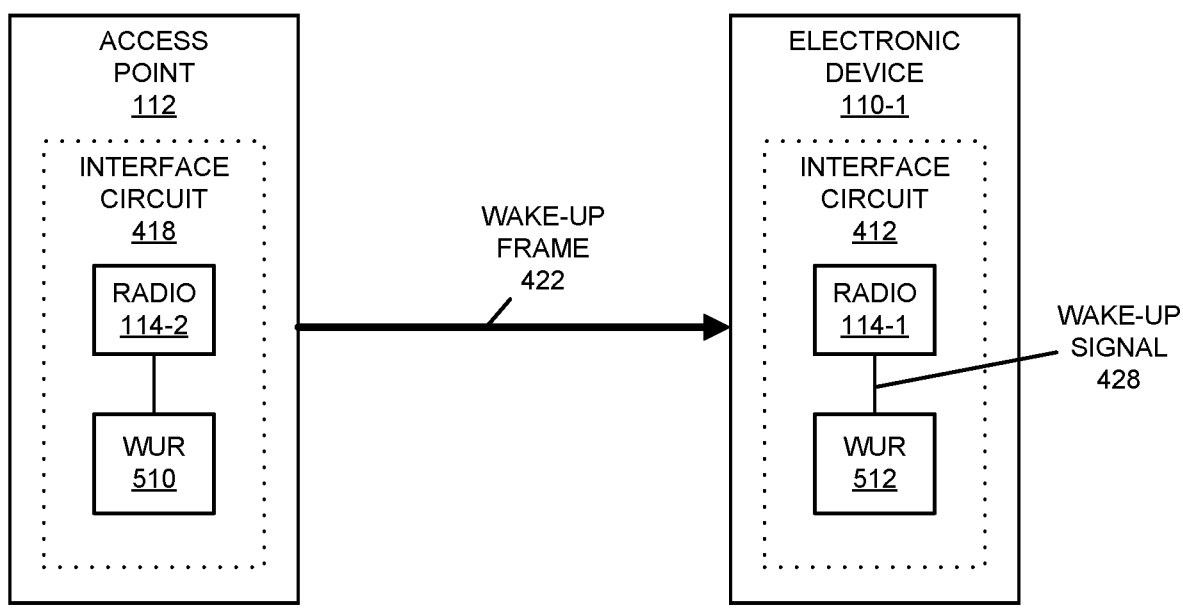
FIG. 5 is a drawing illustrating an example interface circuit in one of the electronic devices in FIG. 1.

As shown in FIG. 5, which presents a drawing illustrating an example of an interface circuit 412 in electronic device 110-1, a WUR 512 (such as WUR 414) may be a companion radio to a main (Wi-Fi) radio 114-1 in interface circuit 412. WUR 512 may allow electronic device 110-1 to turn off main radio 114-1, e.g., whenever possible. Moreover, WUR 512 may provide an acknowledgment when wake-up frame 422 (or a wake-up packet), sent from optional WUR 510 or radio 114-2 in access point 112, specifies electronic device 110-1.

Note that in some embodiments WUR 512 is configured to receive wireless signals, while main radio 114-1 is configured to transmit and receive wireless signals when it is in the higher-power mode. In these ways, the power consumption of WUR 512 may be very low, e.g., lower than Bluetooth Low Energy. In some other embodiments, WUR 512 may be configured to transmit and receive wireless signals, while still achieving a power savings. WUR 512 can operate in an always-on mode and/or in a duty-cycle mode. For example, in the duty-cycle mode, WUR 512 may turn on or listen for a wake-up frame from access point 112 based at least in part on a predefined schedule of electronic device 110-1 (such as a targeted wake-up-time schedule).

In some embodiments, a design objective for IEEE 802.11BA is to have an ultra-low power receiver (e.g., the WUR) at a recipient electronic device (which is sometimes referred to as a 'station' or STA, and which is other than an access point) to receive wake-up frames or packets, e.g., from an access point or another recipient electronic device. In current proposals for IEEE 802.11BA, transmission from the access point to the recipient electronic device may be unidirectional. Subsequent transmissions from the recipient electronic device to the access point may use the main radio. Moreover, in current proposals, the WUR frame may be used to wake up the WUR in the recipient electronic device. The absence of bidirectional support may constrain IEEE 802.11BA in some use cases.

For example, one such use case is peer-to-peer device discovery. In peer-to-peer discovery, the initial discovery of electronic devices usually involves information exchange in both directions (bidirectional communication). However, existing IEEE 802.11BA proposals may only allow an access point to send one or more packets to recipient electronic device(s). This unidirectional communication may constrain the use of IEEE 11BA in peer-to-peer operations, e.g., because the recipient electronic device may have to wake up the main radio in order to send back the initial discovery information to the electronic device that sent the wake-up frame. Consequently, peer-to-peer operation may consume more power than operation according to IEEE 802.11BA, e.g., in an infrastructure context. In addition, sometimes an access point may deliver information to a recipient electronic device that needs or requires an acknowledgement, but for which the recipient electronic device does not need to wake up the main radio. For example, an application-configuration message may be delivered to the recipient electronic device for which the recipient electronic device does not need to take further action except acknowledging the receipt of the information. Without support for bidirectional communication, the recipient electronic device may have to wake up the main radio to acknowledge the receipt of the information, which may increase latency (e.g., wake-up latency) and/or which may increase the power consumption of the recipient electronic device.

Figure 6:
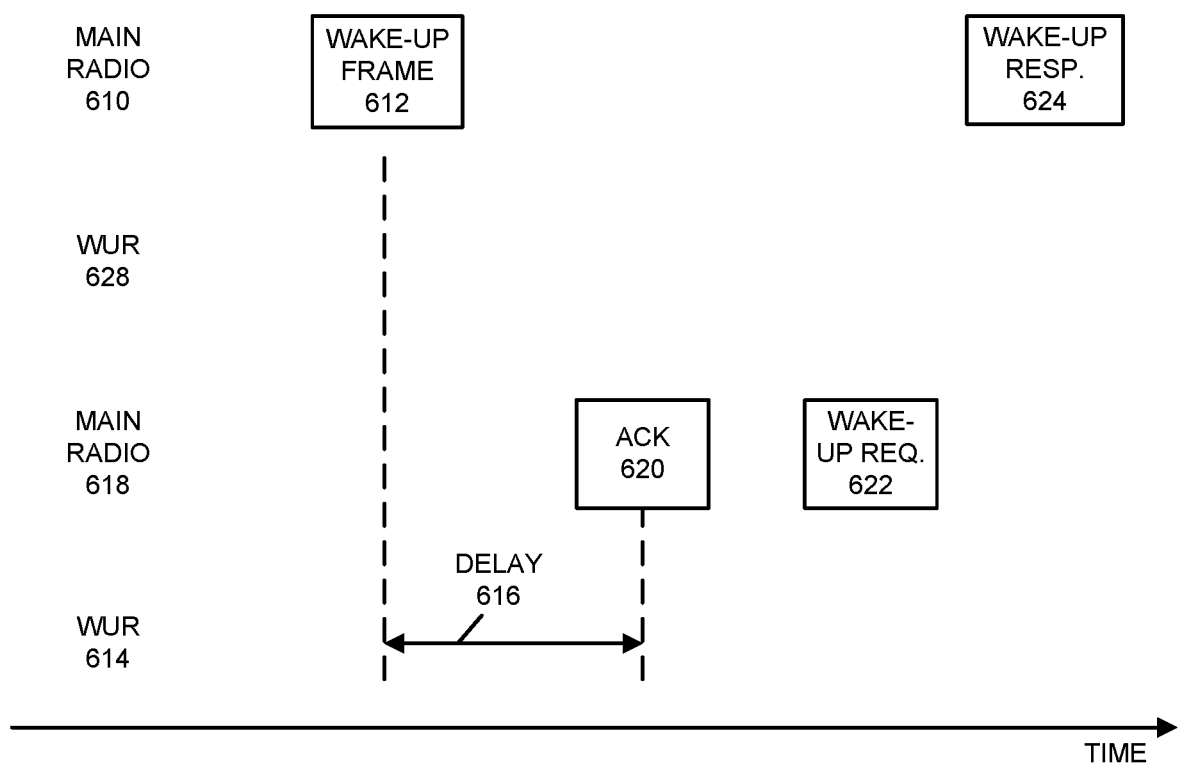

These challenges may be addressed using the communication techniques. Notably, as shown in FIG. 6, which presents a drawing illustrating an example of communication between access point 112 and electronic device 110-1, in current IEEE 802.11BA proposals, a radio 610 in access point 112 (such as a radio that is compatible with IEEE 802.11BA) may transmit a wake-up frame 612 to a WUR 614 in electronic device 110-1. After a wake-up delay 616, a main radio 618 in electronic device 110-1 may transmit an acknowledgement (ACK) 620 to access point 112. Then, main radio 618 in electronic device 110-1 may transmit a WUR request 622 to radio 610 in access point 112, which indicates that electronic device 110-1 is transitioning back to a low-power mode (e.g., using WUR 614). In response, radio 610 in access point 112 may transmit a WUR response 624 to main radio 618 in electronic device 110-1. Note that access point 112 may also include a WUR 628.

In contrast, as shown in FIG. 7, which presents a drawing illustrating an example of communication between access point 112 and electronic device 110-1, in the communication techniques a radio 610 in access point 112 (such as a radio that is compatible with IEEE 802.11BA) may transmit a wake-up frame 612. In response, a WUR 710 in electronic device 110-1 may transmit an ACK 712.

Consequently, in the communication techniques, a main radio 618 in electronic device 110-1 may be operating for less time, which may reduce the power consumption of electronic device 110-1 and the total channel time used for communication between access point 112 and electronic device 110-1.

Thus, in order to enable more-efficient use of IEEE 802.11BA, in the communication techniques WUR 710 may have bidirectional communication with access point 112 or other recipient electronic device (e.g., a peer recipient electronic device). This may include providing an ACK following a wake-up frame.

Figure 8:
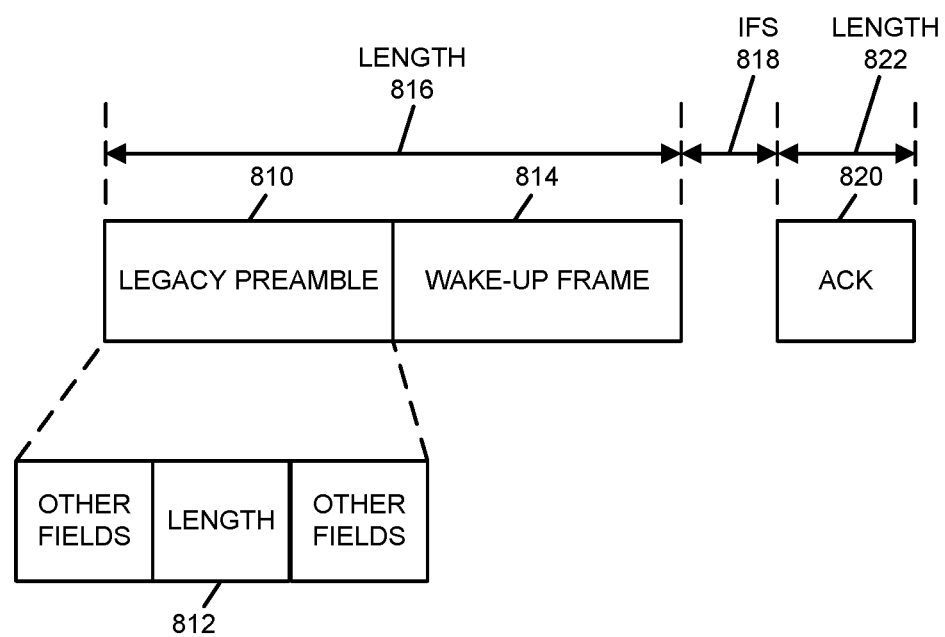

FIG. 8, which presents a drawing illustrating an example of communication between access point 112 and electronic device 110-1, shows an approach for protecting bidirectional frame exchange using a WUR. Notably, existing IEEE 802.11BA packets typically start with, e.g., a 20 MHz legacy preamble 810. The 20 MHz preamble 810 may contain or include a length field 812 that indicates the length 816 or duration of the entire IEEE 802.11BA packet (e.g., the 20 MHz preamble 810 plus a narrow-band wake-up frame 814 or packet). Note that a third-party recipient electronic device that receives the 20 MHz preamble 810 may consider the medium as busy based on this length/duration field and may refrain from transmission during this period of time.

In the described communication techniques, the value of the length field 812 may be the following if the WUR is soliciting an ACK 820: a length 816 of the IEEE 802.11BA packet (e.g., the legacy preamble 810 and wake-up frame 814), plus a length of an inter-frame space (IFS) 818 for the WUR, plus ACK 820 duration 822 or length. Thus, duration 822 may be to the end of ACK 820. Note that ACK 820 may still use a narrow-band transmission (e.g., not 20 MHz), but may modify the length/duration field 812 to protect the uplink ACK 820 from the recipient electronic device to the access point using the WUR.

Figure 9:
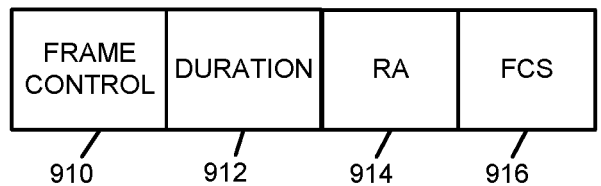
FIGS. 9-11 are drawings illustrating examples of acknowledgment formats during communication between electronic devices, such as the electronic devices of FIG. 1.
Figure 10:
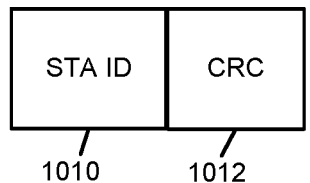
Figure 11:
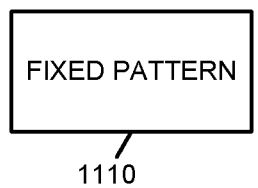

FIG. 9 presents a drawing illustrating an example of an acknowledgment format 900 (such as an acknowledgment format on the main radio) during communication between access point 112 and electronic device 110-1. Moreover, FIGS. 10 and 11 present drawing illustrating examples of WUR acknowledgment formats 1000 and 1100 (such as the IEEE 802.11BA or WUR ACK format) during communication between access point 112 and electronic device 110-1. Notably, because the WUR data rate is very low (e.g., 200-300 kHz), the WUR ACK may need to have a simpler format than the ACK format on main radio. For example, acknowledgment format 900 on the main radio may include: frame control 910, a duration 912, a recipient address (RA) 914 (such as a media access control address), and a frame check sequence (FCS) 916. In contrast, in the described communication techniques some or even most of the fields in the ACK format can be omitted. There may be at least two embodiments for the WUR ACK. In the first embodiment, WUR acknowledgment format 1000 may contain a station identifier 1010 (STA ID) or an identifier of the recipient electronic device, and a cyclic redundancy check 1012 (CRC). Note that the identifier of the recipient electronic device may be a truncated association identifier or AID, such as, e.g., the lowest six least-significant bits in the AID. Moreover, the CRC 1012 field may be, e.g., one or two bits. Alternatively, in the second embodiment, WUR acknowledgment format 1100 may have a fixed pattern 1110 that is known or predefined, such as, e.g., '1111' or '1010'. Note that a WUR ACK may immediately follow a wake-up packet or frame, and it may have a very short duration (such as, e.g., between a couple of bytes and 20 bytes). Consequently, the probability of getting an ACK from a different recipient electronic device may be very low. In other implementations, other formats can be used or the example formats can be modified. Therefore, in other embodiments, the order of items in the WUR acknowledgment formats can vary and additional and/or different items can be included.

Furthermore, there may be several embodiments as to how to send a WUR ACK in the physical layer. For example, the WUR ACK may be sent without a physical layer preamble and/or header. Alternatively, the WUR ACK may be sent with a physical layer preamble and/or header. In some embodiments, the physical layer preamble is the same as the regular WUR packet preamble sent from the access point to the recipient electronic device. In some embodiments, the modulation technique used to send WUR ACK in a physical layer may be the same as that of the wake-up frame or packet sent from the access point to the recipient electronic device. However, the WUR ACK may use a different physical layer preamble format or modulation technique than the wake-up frame or packet preamble or modulation technique. (Thus, the preamble and/or the modulation technique may be different, which is sometimes more generally referred to as the 'physical format.') In these embodiments, other recipient electronic devices can ignore the WUR ACK. In particular, the different physical layer format may make it easier for the other recipient electronic devices to ignore or not process the WUR ACK, thereby simplifying the packet processing.

Additionally, in order to communicate to a recipient electronic device that it needs to acknowledge receipt of a wake-up frame (or not), an ACK indication may be defined in the wake-up-frame or packet format. For example, if a bit in a field is set, e.g., to '1,' then the recipient electronic device may return a WUR ACK. Alternatively, if a bit in a field is set, e.g., to '0,' then the recipient electronic device may not return a WUR ACK. Note that the ACK indication may indicate or otherwise specify the ACK technique, such as using the WUR in the recipient electronic device. In some embodiments, the ACK-solicitation indication also indicates the ACK format of the solicited WUR ACK. In some embodiments, the wake-up frame indicates whether it allows the recipient electronic device to transmit data in the reverse direction. For example, in some embodiments, the WUR ACK may include data in an optional payload. The transmission of any data from the reverse direction can also serve as an ACK to the wake-up-frame transmission from the access point. Thus, the uplink communication using the WUR can be an ACK, data, or a combination of an ACK and data.

Note that the payload field in a WUR ACK may be optional because not all WUR ACKs carry or convey data. There can be several embodiments for the signaling of the payload field. For example, a type (or subtype) field may be defined in a header in the ACK and there may be one or more special type (or subtype) values to indicate the presence of the optional payload. Moreover, a length of the payload field may be signaled or indicated in a variety of ways. In particular, different type/subtype values may indicate a different fixed payload size. For example, a type 1 ACK may contain a 20B payload, a type 2 ACK may contain a 10B payload, etc. Alternatively or additionally, a length field may indicate a size of the payload or the total ACK size (in which case, the payload size can be calculated from the total ACK size minus the size of other fields).

Furthermore, there may be different ACK modes. For example, in one unicast mode, the recipient electronic device may transmit a WUR ACK to the access point after receiving the wake-up frame. Alternatively, in another unicast mode, the recipient electronic device may not transmit an ACK to the access point after receiving the wake-up frame. Additionally, in a multicast mode, there may not be a WUR ACK from the recipient electronic device to the access point when multicast data is received. Note that the ACK mode may be indicated or specified in the wake-up frame or packet.

In summary, in the described communication techniques a WUR may support bidirectional communication. In order to support this capability, a WUR ACK format may defined. Moreover, a wake-up frame or packet may specify a WUR ACK-solicitation indication and/or a WUR data-solicitation indication. Furthermore, a wake-up frame or packet may specify a duration as a way to protect the WUR ACK, e.g., by specifying a duration that is sufficiently long to encompass the WUR ACK. In addition, there may be different ACK modes. Consequently, the communication techniques may reduce the power consumption of the recipient electronic device by reducing the number of times and/or a duration of time that a main radio in the recipient electronic device is transitioned to a higher-power mode and may improve the communication performance by reducing latency.

We now describe embodiments of an electronic device. FIG. 12 presents a block diagram of an electronic device 1200 (which may be a cellular telephone, an access point, another electronic device, etc.) in accordance with some embodiments. This electronic device includes processing subsystem 1210, memory subsystem 1212, and networking subsystem 1214. Processing subsystem 1210 includes one or more devices configured to perform computational operations. For example, processing subsystem 1210 can include one or more microprocessors, application-specific integrated circuits (ASICs), microcontrollers, graphics processing units (GPUs), programmable-logic devices, and/or one or more digital signal processors (DSPs). Thus, the processing subsystem 1210 may including processing circuitry.

Memory subsystem 1212 includes one or more devices for storing data and/or instructions for processing subsystem 1210 and networking subsystem 1214. For example, memory subsystem 1212 can include dynamic random access memory (DRAM), static random access memory (SRAM), a read-only memory (ROM), flash memory, and/or other types of memory. In some embodiments, instructions for processing subsystem 1210 in memory subsystem 1212 include: program instructions or sets of instructions (such as program instructions 1222 or operating system 1224), which may be executed by processing subsystem 1210. For example, a ROM can store programs, utilities or processes to be executed in a non-volatile manner, and DRAM can provide volatile data storage, and may store instructions related to the operation of electronic device 1200. Note that the one or more computer programs may constitute a computer-program mechanism, a computer-readable storage medium or software. Moreover, instructions in the various modules in memory subsystem 1212 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 1210. In some embodiments, the one or more computer programs are distributed over a network-coupled computer system so that the one or more computer programs are stored and executed in a distributed manner.

In addition, memory subsystem 1212 can include mechanisms for controlling access to the memory. In some embodiments, memory subsystem 1212 includes a memory hierarchy that comprises one or more caches coupled to a memory in electronic device 1200. In some of these embodiments, one or more of the caches is located in processing subsystem 1210.

In some embodiments, memory subsystem 1212 is coupled to one or more high-capacity mass-storage devices (not shown). For example, memory subsystem 1212 can be coupled to a magnetic or optical drive, a solid-state drive, or another type of mass-storage device. In these embodiments, memory subsystem 1212 can be used by electronic device 1200 as fast-access storage for often-used data, while the mass-storage device is used to store less frequently used data.

Figure 12:
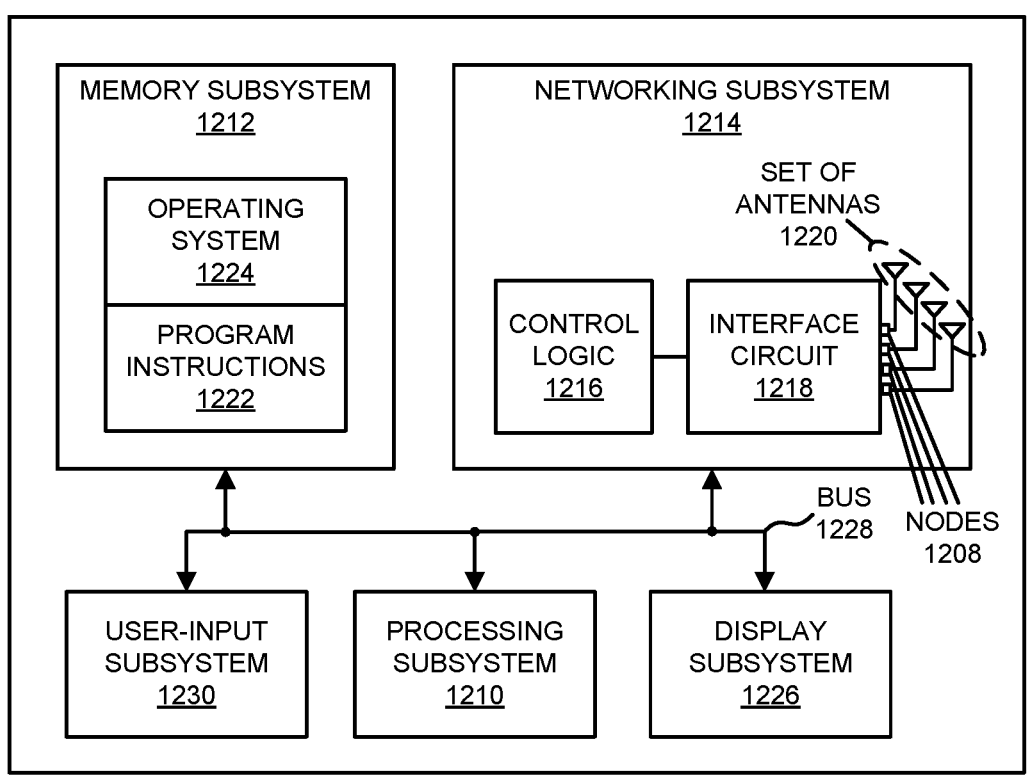
FIG. 12 is a block diagram illustrating an example of one of the electronic devices of FIG. 1.

Networking subsystem 1214 includes one or more devices configured to couple to and communicate on a wired and/or wireless network (i.e., to perform network operations), including: control logic 1216, an interface circuit 1218 and a set of antennas 1220 (or antenna elements) in an adaptive array that can be selectively turned on and/or off by control logic 1216 to create a variety of optional antenna patterns or 'beam patterns.' (While FIG. 12 includes set of antennas 1220, in some embodiments electronic device 1200 includes one or more nodes, such as nodes 1208, e.g., a pad, which can be coupled to set of antennas 1220. Thus, electronic device 1200 may or may not include set of antennas 1220.) For example, networking subsystem 1214 can include a Bluetooth™ networking system, a cellular networking system (e.g., a 3G/4G/5G network such as UMTS, LTE, etc.), a universal serial bus (USB) networking system, a networking system based on the standards described in IEEE 802.11 (e.g., a Wi-Fi® networking system), an Ethernet networking system, and/or another networking system.

In some embodiments, networking subsystem 1214 includes one or more radios, such as a WUR that is used to receive wake-up frames and/or to provide acknowledgments and/or data, and a main radio that is used to transmit and/or to receive frames or packets during a higher-power mode. The WUR and the main radio may be implemented separately (such as using discrete components or separate integrated circuits) or in a common integrated circuit.

Networking subsystem 1214 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 1200 may use the mechanisms in networking subsystem 1214 for performing simple wireless communication between the electronic devices, e.g., transmitting advertising or frame frames and/or scanning for advertising frames transmitted by other electronic devices.

Within electronic device 1200, processing subsystem 1210, memory subsystem 1212, and networking subsystem 1214 are coupled together using bus 1228 that facilitates data transfer between these components. Bus 1228 may include an electrical, optical, and/or electro-optical connection that the subsystems can use to communicate commands and data among one another. Although only one bus 1228 is shown for clarity, different embodiments can include a different number or configuration of electrical, optical, and/or electro-optical connections among the sub systems.

In some embodiments, electronic device 1200 includes a display subsystem 1226 for displaying information on a display, which may include a display driver and the display, such as a liquid-crystal display, a multi-touch touchscreen, etc. Display subsystem 1226 may be controlled by processing subsystem 1210 to display information to a user (e.g., information relating to incoming, outgoing, or an active communication session).

Electronic device 1200 can also include a user-input subsystem 1230 that allows a user of the electronic device 1200 to interact with electronic device 1200. For example, user-input subsystem 1230 can take a variety of forms, such as: a button, keypad, dial, touch screen, audio input interface, visual/image capture input interface, input in the form of sensor data, etc.

Electronic device 1200 can be (or can be included in) any electronic device with at least one network interface. For example, electronic device 1200 may include: a cellular telephone or a smartphone, a tablet computer, a laptop computer, a notebook computer, a personal or desktop computer, a netbook computer, a media player device, an electronic book device, a MiFi® device, a smartwatch, a wearable computing device, a portable computing device, a consumer-electronic device, an access point, a router, a switch, communication equipment, test equipment, as well as any other type of electronic computing device having wireless communication capability that can include communication via one or more wireless communication protocols.

Although specific components are used to describe electronic device 1200, in alternative embodiments, different components and/or subsystems may be present in electronic device 1200. For example, electronic device 1200 may include one or more additional processing subsystems, memory subsystems, networking subsystems, and/or display subsystems. Additionally, one or more of the subsystems may not be present in electronic device 1200. Moreover, in some embodiments, electronic device 1200 may include one or more additional subsystems that are not shown in FIG. 12. Also, although separate subsystems are shown in FIG. 12, in some embodiments some or all of a given subsystem or component can be integrated into one or more of the other subsystems or component(s) in electronic device 1200. For example, in some embodiments program instructions 1222 are included in operating system 1224 and/or control logic 1216 is included in interface circuit 1218.

Moreover, the circuits and components in electronic device 1200 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit') may implement some or all of the functionality of networking subsystem 1214. This integrated circuit may include hardware and/or software mechanisms that are used for transmitting wireless signals from electronic device 1200 and receiving signals at electronic device 1200 from other electronic devices. Aside from the mechanisms herein described, radios are generally known in the art and hence are not described in detail. In general, networking subsystem 1214 and/or the integrated circuit can include any number of radios. Note that the radios in multiple-radio embodiments function in a similar way to the described single-radio embodiments.

In some embodiments, networking subsystem 1214 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals)

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII) or Electronic Design Interchange Format (EDIF). Those of skill in the art of integrated circuit design can develop such data structures from schematic diagrams of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used a Wi-Fi communication protocol as an illustrative example, in other embodiments a wide variety of communication protocols and, more generally, wireless communication techniques may be used. Thus, the communication techniques may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication techniques may be implemented using program instructions 1222, operating system 1224 (such as a driver for interface circuit 1218) or in firmware in interface circuit 1218. Alternatively or additionally, at least some of the operations in the communication techniques may be implemented in a physical layer, such as hardware in interface circuit 1218. In some embodiments, the communication techniques are implemented, at least in part, in a MAC layer and/or in a physical layer in interface circuit 1218.

While examples of numerical values are provided in the preceding discussion, in other embodiments different numerical values are used. Consequently, the numerical values provided are not intended to be limiting.

While the preceding embodiments illustrated the use of a wake-up frame and an acknowledgment that are communicated using Wi-Fi, in other embodiments of the communication techniques Bluetooth Low Energy is used to communicate one or more of these frames or packets. Furthermore, the wake-up frame and/or the acknowledgment may be communicated in the same or a different band of frequencies that the band(s) of frequencies used by the main radio. For example, the wake-up frame and/or the acknowledgment may be communicated in one or more bands of frequencies, including: 900 MHz, 2.4 GHz, 5 GHz, 60 GHz, and/or a band of frequencies used by LTE.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A recipient electronic device, comprising:
a node configured to communicatively couple to an antenna; and
an interface circuit, communicatively coupled to the node, configured to communicate with a second electronic device, wherein the interface circuit comprises a main radio and a wake-up radio (WUR) configured to at least selectively transition the main radio from a lower-power mode to a higher-power mode, and wherein the WUR is configured to:
receive, from the node, a wake-up frame associated with the second electronic device, the wake-up frame specifying that an acknowledgment from the recipient electronic device to the second electronic device is expected; and
provide, to the node, an acknowledgment intended for the second electronic device in response to the wake-up frame.

2. The recipient electronic device of claim 1, wherein the acknowledgment comprises a preamble and a header.

3. The recipient electronic device of claim 1, wherein the acknowledgment excludes a preamble and a header.

4. The recipient electronic device of claim 1, wherein the acknowledgment is communicated using a physical format that is the same as that of the wake-up frame.

5. The recipient electronic device of claim 1, wherein the acknowledgment is communicated using a different physical format from that of the wake-up frame.

6. The recipient electronic device of claim 1, wherein the wake-up frame specifies how the acknowledgment is communicated by the recipient electronic device.

7. The recipient electronic device of claim 1, wherein the wake-up frame specifies that the acknowledgement is communicated by the recipient electronic device using the WUR in the recipient electronic device.

8. The recipient electronic device of claim 1, wherein the wake-up frame specifies a time duration that comprises a duration of the wake-up frame, a duration of an inter-frame space, and a duration of the acknowledgment.

9. The recipient electronic device of claim 1, wherein the acknowledgment comprises a payload field comprising at least an item of data.

10. The recipient electronic device of claim 1, wherein the WUR is configured to provide the acknowledgment while the main radio is in the lower-power mode.

11. The recipient electronic device of claim 1, wherein the wake-up frame is compatible with an IEEE 802.11 communication protocol.

12. A non-transitory computer-readable storage medium for use in conjunction with processing circuitry of a recipient electronic device that comprises a main radio and a wake-up radio (WUR) configured to at least selectively transition the main radio from a lower-power mode to a higher-power mode, the computer-readable storage medium storing program instructions that, when executed by the processing circuitry, cause the recipient electronic device to provide an acknowledgment by carrying out one or more operations comprising:
receiving, using the WUR, a wake-up frame associated with a second electronic device, the wake-up frame specifying that an acknowledgment from the recipient electronic device to the second electronic device is expected; and
providing, using the WUR, an acknowledgment intended for the second electronic device in response to the wake-up frame.

13. The computer-readable storage medium of claim 12, wherein the acknowledgment excludes a preamble and a header.

14. The computer-readable storage medium of claim 12, wherein the acknowledgment is communicated using a different physical format than that of the wake-up frame.

15. The computer-readable storage medium of claim 12, wherein the wake-up frame specifies that the acknowledgement to be communicated using the WUR.

16. The computer-readable storage medium of claim 12, wherein the WUR provides the acknowledgment while the main radio is in the lower-power mode.

17. A method for providing an acknowledgment, comprising:
by a recipient electronic device that comprises a main radio and a wake-up radio (WUR) configured to at least selectively transition the main radio from a lower-power mode to a higher-power mode:
receiving, using the WUR, a wake-up frame associated with a sending electronic device, the wake-up frame specifying that an acknowledgment from the recipient electronic device to the sending electronic device is expected; and
providing, using the WUR, the acknowledgment intended for the sending electronic device in response to the wake-up frame.

18. The method of claim 17, wherein the WUR provides the acknowledgment while the main radio is in the lower-power mode.

19. The method of claim 17, wherein the acknowledgment is communicated using a different physical format from that of the wake-up frame.

20. The method of claim 17, wherein the wake-up frame specifies how the acknowledgment is communicated by the recipient electronic device.

* * * * *